(No Model.)
P. W. SOMERLAD.
INTERFERING BOOT FOR HORSES.
No. 459,661. Patented Sept. 15, 1891.
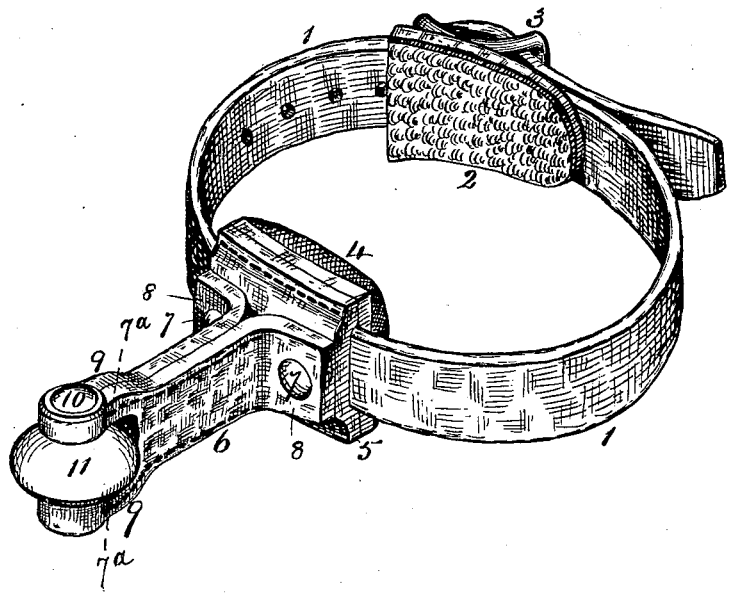
Attest:
E. Arthur
S. H. Knight
Inventor:
Philip W. Somerlad.
By Knight Bro.
Attys.

UNITED STATES PATENT OFFICE.

PHILIP W. SOMERLAD, OF ST. LOUIS, MISSOURI, ASSIGNOR TO MICHAEL DEBATIN, OF SAME PLACE.

INTERFERING-BOOT FOR HORSES.

SPECIFICATION forming part of Letters Patent No. 459,661, dated September 15, 1891.

Application filed March 25, 1890. Serial No. 345,233. (No model.)

*To all whom it may concern:*

Be it known that I, PHILIP W. SOMERLAD, of the city of St. Louis, in the State of Missouri, have invented a certain new and useful Improvement in Interfering-Boots for Horses, of which the following is a full, clear, and exact description, reference being had to the accompanying drawing, forming part of this specification.

This is a boot having an elastic projection with a guard-roller at the end of the same to prevent abrasion of the leg of the horse.

The drawing is a perspective view of the device.

1 is a strap adapted to embrace the leg of the horse above the fetlock.

2 is a soft pad fixed to the strap at the inside of the buckle 3.

4 is a soft pad secured to a leather block 5, which slides endwise on the strap 1, so as to allow the adjustment of the pad to the flat inner side of the shank of the horse's leg, the pad 2 fitting the flat outer side of the shank.

6 is a projection extending at right angles from the block and attached thereto by rivets 7, passing through the ears 8, or other suitable means.

The projection ends in two ears 9 9, through which passes a pin 10, that forms the pintle of a roller 11, which is preferably made of some soft material, as rubber. The projection 7 is preferably composed of a single strip folded upon itself and the folds stitched or secured together as far as the point 7ª, thus leaving an opening for the passage of the pintle 10 between them. The roller is between the ears 9 with the salient part of its periphery extending beyond the ears, so that it is the only part that touches the other leg or foot of the horse and prevents the risk of abrasion, as the roller will turn on coming in coming in contact with an object, and thus will not rub against it, but simply roll past. It will be seen that even if the parts were incrusted with hard dirt no injury would result, as the surface of the roller would still pass the object without rubbing or abrasion.

I do not claim, broadly, the padded strap with a leather projection; but

What I claim as new and of my invention is as follows:

The combination, in a horse-boot, of the strap 1, having the pad 2 and padded block, a flexible projection secured to said block, consisting of a single strip folded and having its outer end cut away so as to form the ears 9, and said folds being stitched or secured together as far as the points 7ª and unsecured from such points to the ends of the ears, so as to form an opening between the folds, a pintle passing through the openings thus formed in the ears, and a roller mounted on said pintle, substantially as set forth.

PHILIP W. SOMERLAD.

In presence of—
SAML. KNIGHT,
J. M. MAROT.